(12) United States Patent
Gennesseaux et al.

(10) Patent No.: US 6,236,296 B1
(45) Date of Patent: May 22, 2001

(54) ELECTROMAGNETIC ACTUATOR

(75) Inventors: André Gennesseaux, Conie-Molitard; Jean-Luc Gastineau, St. Jean Froidmentel; Sylvain Durand, Villorceau; Joël Menager, St-Hilaire sur Yerre, all of (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 09/569,000

(22) Filed: May 11, 2000

(30) Foreign Application Priority Data

May 17, 1999 (FR) .................................................. 99 06218

(51) Int. Cl.[7] ................................. H01F 3/00; H01F 7/08
(52) U.S. Cl. ........................................... 335/279; 335/270
(58) Field of Search .................... 335/220, 221, 335/243, 247, 248, 249, 252, 257, 270, 271, 277, 279; 74/574; 267/140.14, 140.15

(56) References Cited

U.S. PATENT DOCUMENTS

| | | | |
|---|---|---|---|
| 4,455,496 | * 6/1984 | Dean et al. | 310/29 |
| 4,596,158 | * 6/1986 | Strugach | 74/5 F |
| 5,388,812 | 2/1995 | Kojima et al. | 267/140.14 |
| 5,621,293 | 4/1997 | Gennesseaux | 318/687 |
| 5,961,104 | 10/1999 | Gennesseaux | 267/140.14 |

FOREIGN PATENT DOCUMENTS

| | | |
|---|---|---|
| 0 544 576 | 6/1993 | (EP) . |
| 0 893 620 | 1/1999 | (EP) . |

OTHER PUBLICATIONS

French Preliminary Search Report dated Jan. 17, 2000, French Application FR 9906218.

* cited by examiner

Primary Examiner—Ramon M. Barrera
(74) Attorney, Agent, or Firm—Marshall, O'Toole, Gerstein, Murray & Borun

(57) ABSTRACT

Electromagnetic actuator including a mobile magnetic member made up of stacked ferromagnetic plates and two fixed electromagnets for reciprocating the mobile magnetic member along a central axis. The ferromagnetic plates each have two opposite edges parallel to the central axis which are crimped to two rigid transverse strips. Elastomer bodies join each transverse strip to a fixed spacer.

9 Claims, 5 Drawing Sheets

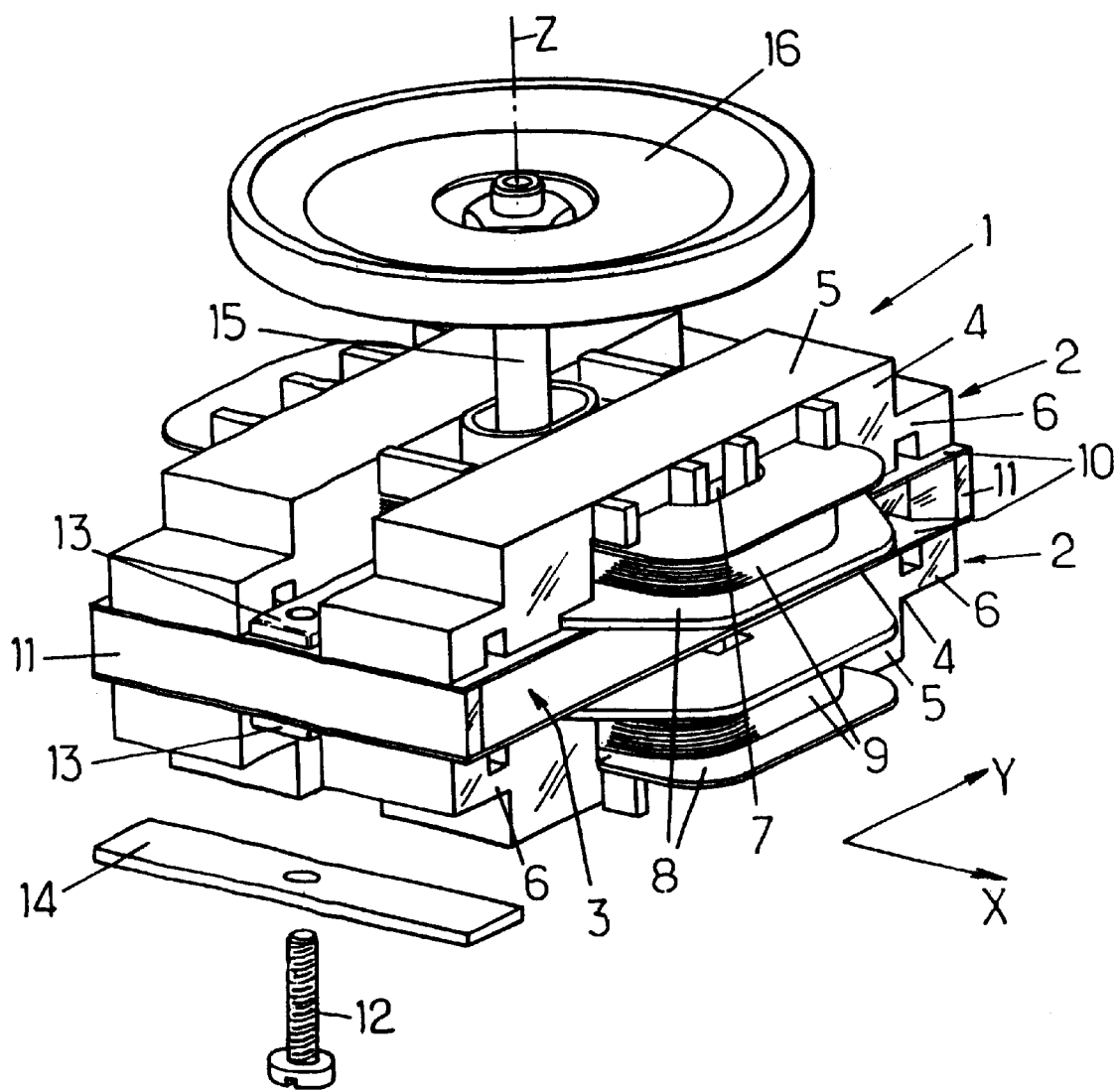

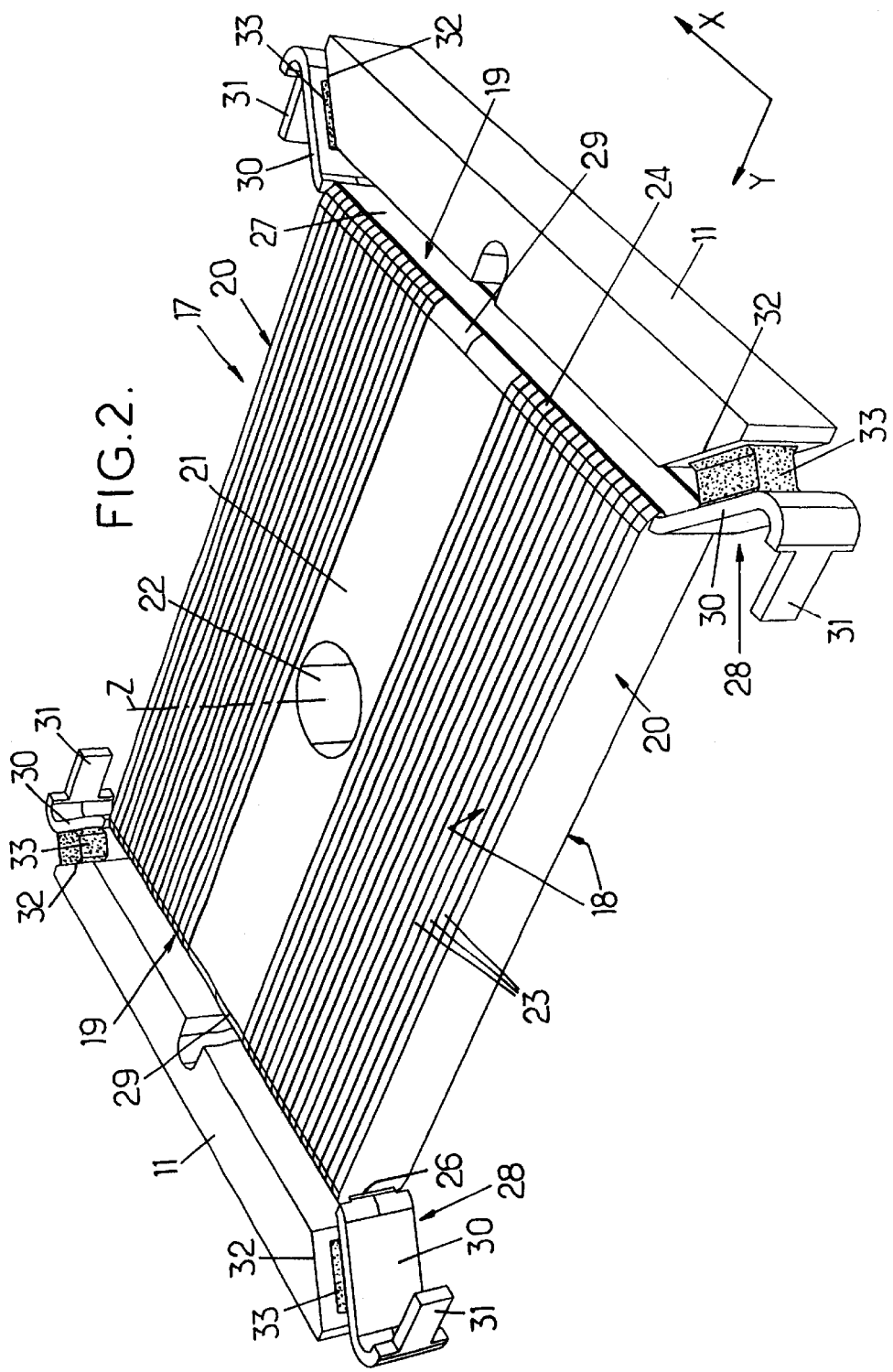

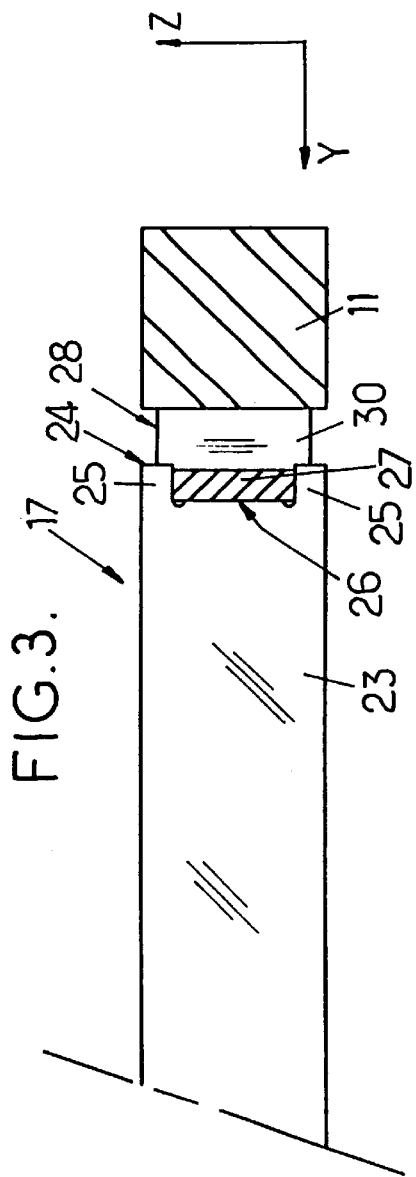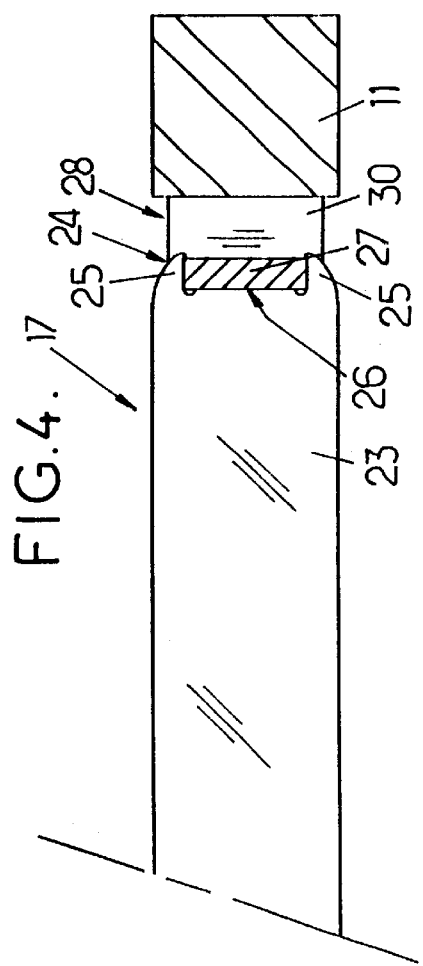

ELECTROMAGNETIC ACTUATOR

FIELD OF THE INVENTION

The present invention relates to electromagnetic actuators.

The invention relates more particularly to an electromagnetic actuator including:

- a mobile magnetic member which can reciprocate in translation along a central axis, said mobile magnetic member including stacked rigid ferromagnetic plates and said mobile magnetic member being joined to a fixed yoke by elastomer bodies which allow the mobile magnetic member to reciprocate parallel to the central axis, and
- at least one electromagnet which is fastened to said yoke and which is adapted to reciprocate the mobile magnetic member along the central axis when a current that varies with time flows through said electromagnet.

BACKGROUND OF THE INVENTION

The document EP-A-0 544 576 describes an example of an electromagnetic actuator of the above kind whose operation is entirely satisfactory.

Nevertheless, the practical implementation of the mobile magnetic member leads to the following problems:

the assembly of ferromagnetic plates of the mobile magnetic member must be very stiff, especially as the mobile magnetic member is generally slim, with a relatively small thickness in the direction of the central axis, the assembly of ferromagnetic plates must have a high resistance to fatigue, especially as the mobile magnetic member is subjected during its service life to a very large number (generally several billion) of alternating force cycles due to its reciprocating movement, because the airgap between the magnetic member and the electromagnet is generally very small, for example of the order of 1 mm, the assembly must be very accurate and must guarantee perfect flatness of the mobile magnetic member, and the assembly must prevent Eddy currents.

No satisfactory solution to the above technical problems has yet been found, whether by sticking the plates (insufficient fatigue resistance), welding them (insufficient fatigue resistance, residual stresses in the ferromagnetic plates and deterioration of the magnetic properties of the plates) or embedding them in a moulded elastomer (insufficient fatigue resistance).

OBJECTS AND SUMMARY OF THE INVENTION

Thus a particular object of the present invention is to solve the technical problems referred to above.

To this end, in accordance with the invention, an electromagnetic actuator of the kind in question is characterised in that:

each ferromagnetic plate has first and second opposite edges parallel to the central axis, the first edges of the ferromagnetic plates are aligned with each other along a first transverse axis perpendicular to the central axis and the second edges of the ferromagnetic plates are also aligned with each along said first transverse axis, the ferromagnetic plates are fastened to respective first and second rigid transverse strips which are respectively fixed to the first and second edges of each ferromagnetic plate by crimping, and the elastomer bodies join each transverse strip to the fixed yoke.

This produces an assembly which is particularly rigid and resistant to fatigue.

Moreover, relative movement of the plates in the stack of ferromagnetic plates is unrestricted prior to crimping, which enables the ferromagnetic plates to be positioned perfectly at the time of crimping, guaranteeing a highly accurate assembly.

Additionally, the assembly method used prevents residual stresses and does not modify the magnetic properties of the ferromagnetic plates in any way, unlike welding.

Finally, the ferromagnetic plates are connected to the transverse strip at the lateral faces of the mobile member, where there is virtually no magnetic flux, which prevents Eddy currents.

Any of the following features may be used in preferred embodiments of the invention:

the transverse strips are plates each of which is parallel to the first transverse axis and to the central axis;

the first and second edges of each ferromagnetic plate each include two fingers which project parallel to a second transverse axis perpendicular to the central axis and to the first transverse axis, a notch is defined between the two fingers and receives the corresponding transverse strip and each finger is crimped to said transverse strip;

the transverse strips are crimped to the ferromagnetic plates: this avoids bending the ferromagnetic plates and interferes as little as possible with their magnetic properties;

each transverse strip has a central part which extends along the first transverse axis between two diverging oblique ends each of which diverges from said central part of the transverse strip and said transverse strip is joined to the fixed yoke by two elastomer bodies stuck between each divergent end of the transverse strip and two support faces of the fixed yoke which are parallel to said divergent ends: the mobile magnetic member is therefore substantially immobilised in the direction perpendicular to the central axis;

the elastomer bodies are each stuck between an outside face of one transverse strip parallel to the central axis and to the first transverse axis and a support face of the fixed yoke parallel to said external face of the corresponding transverse strip;

at least one transverse strip is extended by an electrical connection terminal, the transverse strips and the ferromagnetic plates are electrically conductive and in electrical contact with each other and the electromagnetic actuator further includes at least one fixed conductive plate parallel to the mobile magnetic member and forming with it a capacitive position sensor;

the fixed yoke includes separate first and second rigid spacers respectively disposed along the first and second transverse strips with the mobile magnetic member between them;

the entire mobile magnetic member is covered with a moulded elastomer material which incorporates the elastomer bodies; and the electromagnetic actuator includes two opposed electromagnets on respective opposite sides of the mobile magnetic member relative to the central axis.

BRIEF DESCRIPTION OF THE DRAWINGS

Other features and advantages of the invention will become apparent in the course of the following description of several embodiments of the invention, which is given by way of non-limiting example and with reference to the accompanying drawings.

In the drawings:

FIG. 1 is a diagrammatic perspective view showing a first embodiment of an electromagnetic actuator according to the invention, omitting the mobile magnetic member of the actuator, FIG. 2 is a perspective view of the mobile magnetic member to be fitted to the electromagnetic actuator shown in FIG. 1, FIG. 3 is a view in cross-section of the mobile magnetic member shown in FIG. 2 before crimping the ferromagnetic plates to the transverse strips, FIG. 4 is a view similar to that of FIG. 3 after clamping the ferromagnetic strips.

MORE DETAILED DESCRIPTION

Figure 5:
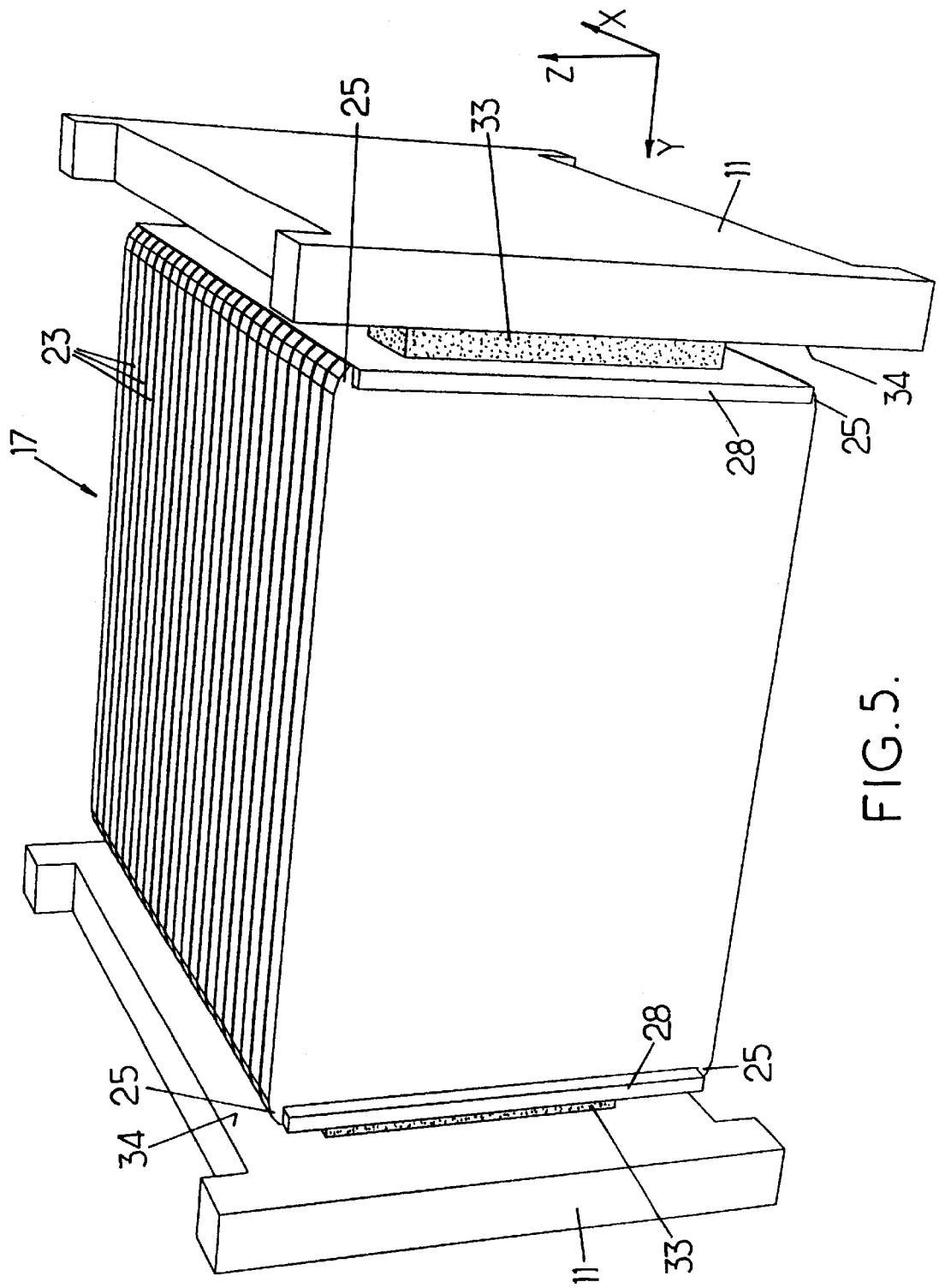
FIGS. 5 and 6 are views similar to that of FIG. 2 for second and third embodiments of the invention, respectively.

In the various figures, the same reference numbers designate identical or similar parts.

As shown diagrammatically in FIG. 1, the invention relates to an electromagnetic actuator which is more particularly intended to be fitted to a hydraulic anti-vibration support disposed between the engine of an automotive vehicle and the bodyshell of the vehicle. The document EP-A-0 893 620 in particular describes one example of a hydraulic anti-vibration support of this kind.

The electromagnetic actuator 1 includes two opposed electromagnets 2 delimiting between them a free space 3 adapted to contain a mobile magnetic member 17 that will be described hereinafter and which is reciprocated at high speed in translation along a central axis Z by the electromagnets 2.

Each of the electromagnets 2 includes:
- a fixed laminated magnetic material yoke 4 which in this example is substantially E-shaped with a central core 5 perpendicular to the axis Z, two lateral branches 6 parallel to the axis Z and a central branch 7 also parallel to the axis Z,
- a plastics material structure 8 fastened to the yoke 4, and
- a coil 9 wound around the central branch 7 of the magnetic material yoke 4 and supported by the plastics material structure 8.

The facing faces of the two electromagnets are preferably each equipped with a fixed plate 10 perpendicular to the axis Z and forming a capacitive sensor electrode. For example, each plate 10 can be made from an insulative material and covered with a layer of metallisation facing the free space 3.

Also, the electromagnets 2 are separated from each other by two rigid spacers 11 disposed between the plates 10 mentioned above. These spacers extend longitudinally along a transverse axis X.

For example, the electromagnets 2 and the spacers 11 are assembled by means of screws 12 fixed to a casing (not shown) and passing through the spacers 11 and the lugs 13 of the plastics material structure 8, possibly with bearing washers 14 under the heads of the screws 12.

The electromagnetic actuator 1 further includes an axial rod 15 which is fastened to the mobile magnetic member and extends parallel to the axis Z as far as a piston 16 similar to that described in the document EP-A-0 893 620 mentioned above, for example. The piston generates in a hydraulic chamber of the anti-vibration support referred to above countervibrations which neutralise engine vibrations.

As shown in FIG. 2, the mobile magnetic member 17 is received into the free space 3 described above and is generally parallelepiped-shaped, having:
- two rectangular main faces 18 perpendicular to the axis Z, the diagonal of each main face having a length of approximately 70 mm, for example, and the two main faces 18 being separated from each other by the thickness of the mobile magnetic member 17, which can be of the order of 5 mm, for example,
- two lateral faces 19 which extend along the two spacers 11 parallel to the axes X and Z, respectively, and
- two lateral faces 20 which extend parallel to the axis Z and to an axis Y perpendicular to the axes Z and X mentioned above.

In the embodiment shown in FIG. 2, the mobile magnetic member 17 has a solid metal core 21 incorporating a bore 22 into which the rod 15 mentioned above is fixed. The core is disposed between two stacks of rigid ferromagnetic plates 23 made of silicon steel, for example.

Each ferromagnetic plate 23 has a plane shape and lies in the plane of the axes Y and Z between first and second edges 24 parallel to the axis Z.

As shown in FIG. 3, each edge 24 of each ferromagnetic plate 23 extends parallel to the axis Z between two ends which each form a finger 25 parallel to the axis Y and projecting outwards. A notch 26 is defined between the fingers 25.

The notches 26 of the various ferromagnetic plates 23 are aligned and parallel to the axis X with the result that the set of said notches forms a groove adapted to receive the plane central part 27 of a rigid strip 28 on each lateral face 19 of the mobile magnetic member.

At the time of assembling the mobile magnetic member 17, the ferromagnetic plates 23 are all independent of each other and the core 21 is independent of the ferromagnetic plates 23. Nesting each transverse strip 28 in the corresponding notches 26 therefore positions the ferromagnetic plates 23 and the core 21 perfectly. Once this positioning has been effected, the fingers 25 of the ferromagnetic plates 23 are crimped to the corresponding transverse strip 28, as are lugs 29 formed at the opposite ends of the core 21 in corresponding relationship to the fingers 25 of the plates 23.

As shown in FIG. 2, each transverse strip 28 is advantageously in the form of a sheetmetal tongue whose width is parallel to the axis Z and whose length is parallel to the axis X. The central part 27 of each transverse strip 28 is advantageously extended outwards by two diverging ends 30, each of which is bent obliquely, at substantially 45°, and diverges from said central part 27 and from the ferromagnetic plates 23.

Each of the bent ends 30, or at least one of the ends 30 of one of the strips 28, is extended by an electrical connection terminal 31 adapted to be connected to a measuring device also connected to the electrodes 10 mentioned above, the mobile magnetic member 17 and these electrodes together forming the capacitive sensor.

Additionally, the spacer 11 has bearing faces 32 at its ends which face and are parallel to the bent ends 30 of each strip 28. A moulded elastomer stud 33 is stuck between each bent end 30 and each corresponding bearing face 32, preferably before crimping the transverse strips 28.

This arrangement of the elastomer studs 33 maintains excellent centering of the mobile magnetic member 17 in the plane perpendicular to the axis Z whilst allowing the mobile magnetic member 17 to move parallel to the axis Z.

The embodiment of the invention shown in FIG. 5 is similar to that previously described and for this reason is not described in detail. The embodiment shown in FIG. 5 differs from that shown in FIGS. 1 to 4 in the following respects:

the mobile magnetic member 17 is thicker than previously in the direction parallel to the axis Z, because the free space 3 in the electromagnetic actuator has dimensions adapted to accommodate the mobile magnetic member 17, and therefore has a greater mass: the magnetic member 17 then serves as a "beater", its movement alone generating the countervibrations intended to cancel the engine vibrations, without using any rod 15 or piston 16, the transverse strips 28 are entirely plane and lie in the plane of the axes X and Z, the strips 28 are joined to the spacers 11 by elastomer studs 33 which are stuck to the outside face of each transverse strip 28 and to the inside face 34 of the corresponding spacer 11, which is parallel to the axes X and Z, and the mobile magnetic member 17 does not include the central core 21 previously described.

Figure 6:
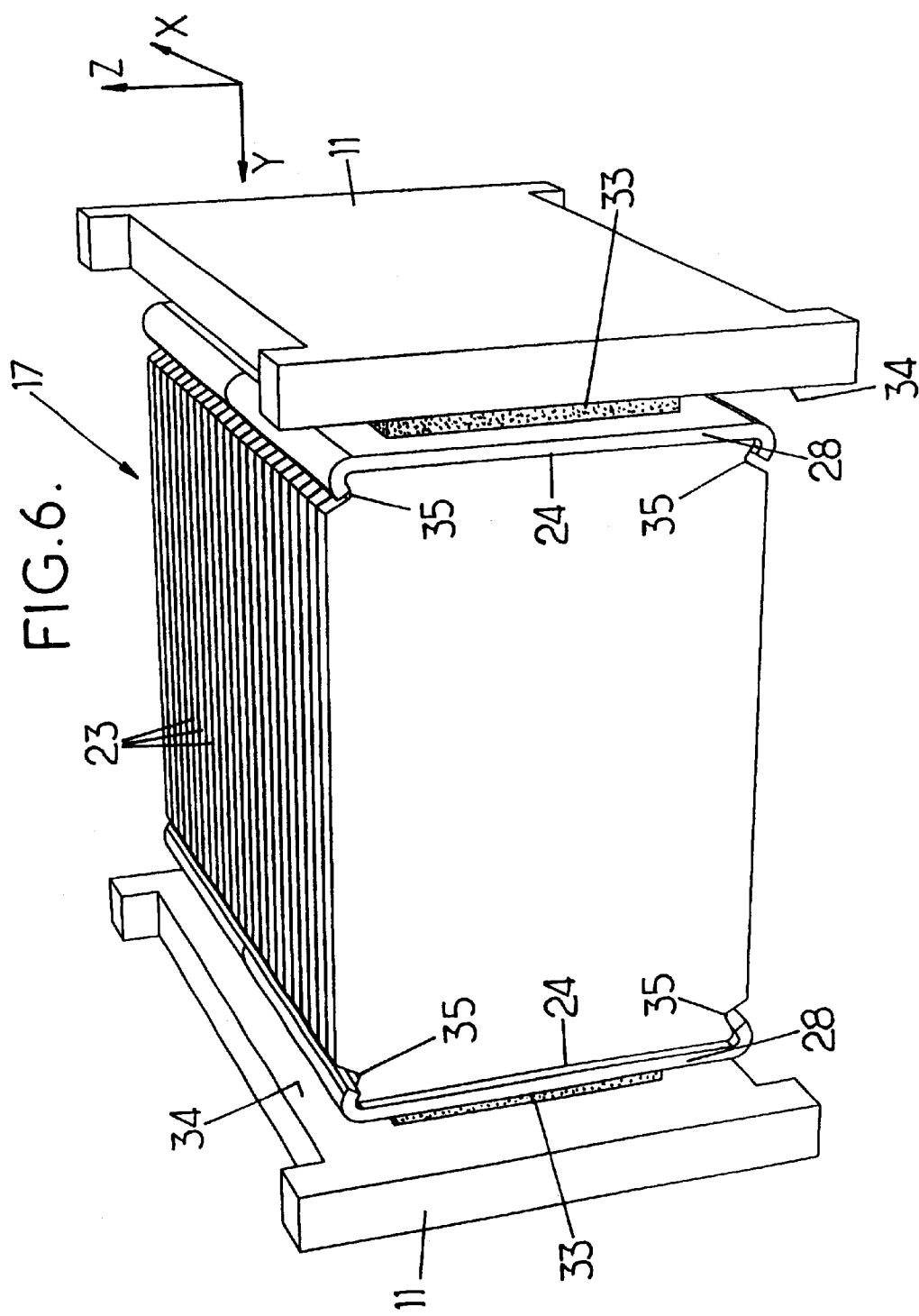

Finally, the embodiment shown in FIG. 6 is similar to that shown in FIG. 5 except that the ends of each transverse strip 28 are crimped into notches 35 formed at both ends of each edge 24 of each ferromagnetic plate 23. These notches are open in the direction of the axis Z.

Of course, this latter crimping method could be used in the embodiment shown in FIGS. 1 to 4.

In all the embodiments, all or virtually all of the mobile magnetic member 17 could be covered with a moulded elastomer material incorporating the studs 33 after crimping the transverse strips 28.

We claim:

1. An electromagnetic actuator including:

a mobile magnetic member which can reciprocate in translation along a central axis, said mobile magnetic member including stacked rigid ferromagnetic plates and said mobile magnetic member being joined to a fixed yoke by elastomer bodies which allow the mobile magnetic member to reciprocate parallel to the central axis, and at least one electromagnet which is fastened to said yoke and which is adapted to reciprocate the mobile magnetic member along the central axis when a current that varies with time flows through said electromagnet, wherein:

each ferromagnetic plate has first and second opposite edges parallel to the central axis, the first edges of the ferromagnetic plates are aligned with each other along a first transverse axis perpendicular to the central axis and the second edges of the ferromagnetic plates are also aligned with each along said first transverse axis, the ferromagnetic plates are fastened to respective first and second rigid transverse strips which are respectively fixed to the first and second edges of each ferromagnetic plate by crimping, and the elastomer bodies join each transverse strip to the fixed yoke.

2. An electromagnetic actuator according to claim 1 wherein the transverse strips are plates each of which is parallel to the first transverse axis and to the central axis.

3. An electromagnetic actuator according to claim 1 wherein the first and second edges of each ferromagnetic plate each include two fingers which project parallel to a second transverse axis perpendicular to the central axis and to the first transverse axis, a notch is defined between the two fingers and receives the corresponding transverse strip and each finger is crimped to said transverse strip.

4. An electromagnetic actuator according to claim 1 wherein the transverse strips are crimped to the ferromagnetic plates.

5. An electromagnetic actuator according to claim 1 wherein each transverse strip has a central part which extends along the first transverse axis between two diverging oblique ends each of which diverges from said central part of the transverse strip and said transverse strip is joined to the fixed yoke by two elastomer bodies stuck between each divergent end of the transverse strip and two support faces of the fixed yoke which are parallel to said divergent ends.

6. An electromagnetic actuator according to claim 1 wherein the elastomer bodies are each stuck between an outside face of one transverse strip parallel to the central axis and to the first transverse axis and a support face of the fixed yoke parallel to said external face of the corresponding transverse strip.

7. An electromagnetic actuator according to claim 1 wherein at least one transverse strip is extended by an electrical connection terminal, the transverse strips and the ferromagnetic plates are electrically conductive and in electrical contact with each other and the electromagnetic actuator further includes at least one fixed conductive plate parallel to the mobile magnetic member and forming with it a capacitive position sensor.

8. An electromagnetic actuator according to claim 1 wherein the fixed yoke includes separate first and second rigid spacers respectively disposed along the first and second transverse strips with the mobile magnetic member between them.

9. An electromagnetic actuator according to claim 1 including two opposed electromagnets on respective opposite sides of the mobile magnetic member relative to the central axis.

* * * * *